(12) United States Patent
Abzarian et al.

(10) Patent No.: US 8,898,460 B2
(45) Date of Patent: Nov. 25, 2014

(54) DEVICE ENFORCED FILE LEVEL PROTECTION

(75) Inventors: David Abzarian, Kirkland, WA (US); Harish S. Kulkarni, Redmond, WA (US); Todd L. Carpenter, Monroe, WA (US); Cinthya R. Urasaki, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 976 days.

(21) Appl. No.: 12/364,523

(22) Filed: Feb. 3, 2009

(65) Prior Publication Data

US 2010/0199108 A1 Aug. 5, 2010

(51) Int. Cl.
*H04L 29/06* (2006.01)

(52) U.S. Cl.
CPC ................ *G60F 21/805* (2013.01)
USPC ....................................................... 713/165

(58) Field of Classification Search
CPC ......... G06K 19/00; G06F 21/00; G06F 21/60; G06F 21/6218; G06F 21/6227
USPC ........ 713/165, 166, 193; 726/30, 32; 380/201
See application file for complete search history.

(56) References Cited

U.S. PATENT DOCUMENTS

| | | | |
|---|---|---|---|
| 5,930,826 A | 7/1999 | Lee et al. | |
| 6,731,536 B1 | 5/2004 | McClain et al. | |
| 7,111,121 B2 | 9/2006 | Oishi et al. | |
| 7,266,608 B2 * | 9/2007 | Ishida et al. | 709/227 |
| 7,346,782 B2 | 3/2008 | Asoh et al. | |
| 7,962,755 B2 * | 6/2011 | Pizano et al. | 713/186 |
| 2003/0101140 A1 * | 5/2003 | So et al. | 705/51 |
| 2006/0107317 A1 | 5/2006 | Moran et al. | |
| 2007/0214369 A1 | 9/2007 | Roberts et al. | |
| 2008/0065852 A1 * | 3/2008 | Moore et al. | 711/170 |
| 2009/0175441 A1 * | 7/2009 | Boscher et al. | 380/28 |
| 2009/0193266 A1 * | 7/2009 | Gable et al. | 713/193 |

OTHER PUBLICATIONS

"GuardianEdge Data Protection Platform", Retrieved at <<http://products.enterpriseitplanet.com/security/security/1174401235.html>>, Nov. 24, 2008, pp. 4.
"Folder Castle 4.0", Retrieved at <<http://www.freedownloadmanager.org/downloads/Folder_Castle_55647_p/>>, Nov. 24, 2008, pp. 2.
"IBM Data Security Services for Endpoint Data Protection—Endpoint Encryption Solution", Retrieved at <<http:// www-935.ibm.com/services/us/gts/pdf/sp_br_endpoint-encryption-solution.pdf>>, pp. 6.

* cited by examiner

*Primary Examiner* — Dant Shaifer Harriman
(74) *Attorney, Agent, or Firm* — John Jardine; Sade Fashokun; Micky Minhas (57) ABSTRACT

Described is a technology by which files that are hardware protected on a storage device, such as a USB flash drive, are managed on a host, including by integration with an existing file system. Each file maintained on a storage device is associated with a protection attribute that corresponds to that file's device hardware protection level. Requests directed towards accessing metadata or actual file data are processed based upon the protection attribute and a state of authentication, e.g., to allow or deny access, show file icons along with their level of protection, change levels, and so forth. Also described is splitting a file system file table into multiple file tables, one file table for each level of protection. Entries in the split file tables are maintained based on each file's current level; space allocation tracking entries are also maintained to track the space used by other split tables.

20 Claims, 8 Drawing Sheets

DEVICE ENFORCED FILE LEVEL PROTECTION

BACKGROUND

Transient storage devices, such as USB flash drives, pose a security risk because they can be easily lost or stolen. In general, the stored data is inherently unprotected and therefore accessible. Device manufacturers and software developers have offered a number of software-based and hardware-based solutions to this problem; however they are generally inadequate and thus not widely used.

The drawbacks to software-based solutions result from weaknesses in software-based encryption and access control. Software-based encryption and access control is based up platform-specific software, which limits the portability of the device to other platforms. Further, software-based encryption can overwhelm devices with limited processing power. Significantly, software encrypted data suffers from degraded security, because software encryption cannot protect data from offline brute force decryption.

Current hardware-based solutions are unable to provide device side protection on a per-file basis, as a result of host file system dependencies. For example, a user cannot hardware encrypt or hardware write protect individual files. What is needed is a mechanism for providing device-side (hardware-based) file level protection, which can be applied to various host file systems in a generic manner, including on a per-file basis.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which files that are hardware protected on a storage device, such as a USB flash drive, are integrated with an existing file system. To this end, a file maintained on a storage device is associated with a protection attribute that corresponds to the device hardware protection level of the file. Upon receiving a request directed towards accessing metadata or actual data of the file, the request is processed based upon the protection attribute and a state of authentication.

In one aspect, file access is allowed or denied based upon the attribute (although the hardware protects actual access). In another aspect, information about the file may be output, such as to a graphical user interface, with the attribute used to determine whether, and if so, how, the information appears, e.g., with a visible indication as to any level of protection. A user interface mechanism may also be used to change the level of protection associated with a file, which also updates the attribute.

In one aspect, at least one bit of a set of attribute bits defined by a file system to indicate the hardware protection level; for example, the file attributes of the FAT file system may be overloaded with one bit to indicate encryption protection, and/or one bit to indicate write protection. In an alternative, the set of other attributes associated with the file may be extended, such as by including data in an alternate stream of the file that indicates the level of device hardware protection.

In one aspect, a file system file table may be split (e.g., by a driver) into multiple file tables, one file table for each level of protection. When a file is first associated with an attribute, or is moved to another level, the appropriate table or tables are adjusted so that an entry for that file appears in the file table that corresponds to the file's current level. Space allocation tracking ("dummy") entries are also maintained in each split table so as to track the space used by any other split table or tables.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a mechanism for enforcing various degrees of granular file level protection on a storage device that has hardware-based enforcement, (which is likely very advantageous for transient storage devices.) As will be understood, this may be accomplished without modifying the file system, and is thus independent of any particular file system.

To this end, file system attributes are extended or modified (via overloaded attribute bits) to indicate device enforcement of a specific protection. These attributes may be used by an operating system component, such as to visually display the hardware protection state of files, and may be processed when reading/writing data to the storage device. In various aspects, also described is file system table splitting to integrate device-enforced file protection, while providing other benefits such as automatically hiding/showing protected files for viewing based on the authentication state of the viewer.

In one aspect, also described is a user experience directed towards file protection. In one implementation, this is exemplified as a user interface for simultaneously viewing device enforced protection attributes for multiple files, and a user interface for modifying the protection attribute for a file.

While the examples herein show a transient storage device configured to work with the well-known FAT (File Allocation Table) file system or with the well-known Windows® NT file system (NTFS), it should be understood that these and any other examples described herein are non-limiting examples. Indeed, instead of a transient storage device, another secure execution environment, such as built into a storage device of the host system, may benefit from the technology described herein; (e.g., a shared computer system may have its storage hardware-protected via a secure execution environment such that certain areas of storage are inaccessible and/or read-only to users that do not properly authenticate). Further, it is understood that virtually any contemporary file system may benefit from the technology described herein. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and data storage in general.

Figure 1:
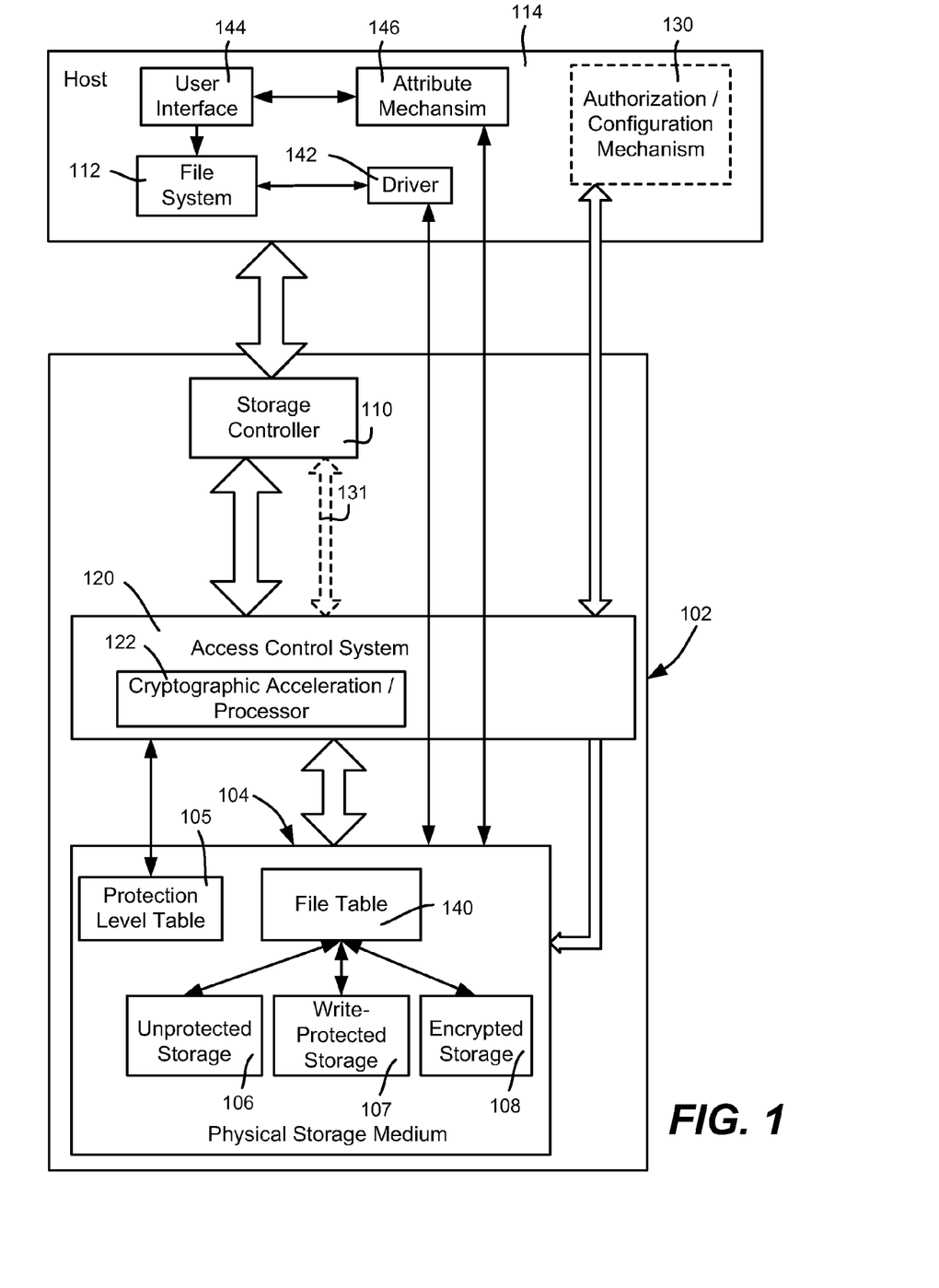
FIG. 1 is a block diagram showing example components for integrating a device having hardware protection levels with an existing file system via file attributes.

FIG. 1 shows a storage device 102 including various aspects of the technology described herein, comprising a physical storage medium 104 capable of being electronically read from and electronically written to, such as a flash RAM or other storage medium. In general, U.S. patent application Ser. No. 12/113,199, assigned to the assignee of the present application and hereby incorporated by reference, describes how a storage device such as the device 102 may have its physical storage medium 104 subdivided into a number of regions, each region having different access levels as protected by hardware. In a typical implementation, each region comprises a set of blocks, with a hardware-protected table 105 or the like that determines the protection level for each block or range of blocks.

In the example of FIG. 1, three regions with different levels of protection are exemplified, namely unprotected storage 106, write-protected (read-only) storage 107, and encrypted storage 108. As can be readily appreciated, other levels are feasible for regions, such as both write-protected and encrypted storage, different encrypted storage regions each with different credentials needed and/or type of encryption, individual files that are digital rights managed, and so forth.

In general, the device 102 includes a storage controller 110 that may receive commands for accessing the physical storage medium 104, such as provided through a file system 112 of a host computer system 114. However, with the device 102 having hardware protection, the storage controller 110 accesses the physical storage medium 104 via an access control system 120 that enforces access at the device level, e.g., including via a cryptographic acceleration processor 122. In this manner, depending on an authentication state and the protection level associated with the type of storage for which access is being attempted, the access control system 120 may allow full access, may deny access entirely or may prevent writes to a write-protected area.

As also represented in FIG. 1 is an out-of-band authorization/configuration mechanism 130 that may be used to interface with the access control system 120, such as to authenticate the current user, including requiring proper credentials as desired (e.g., a private key certificate, such as maintained on a smartcard). Note that this component is shown via a dashed block to indicate it typically is only coupled to the device 102 when authentication or the like is performed.

In an alternative, the data channel illustrated in FIG. 1 by the dashed arrow 121 can be used instead of (or in addition to the out-of-band authorization/configuration mechanism 130), such as if the device chooses to expose its interfaces via an IEEE 1667 compatible silo, which provides access through a typical storage controller such as the storage controller 110. For example, at least one LUN may be organized based on an ACT (Addressable Command Target) paradigm, in which access to data may be accomplished in accordance with at least one silo. Each ACT may thus contain one or more silos. An example of an ACT paradigm having silos is promulgated by the Institute of Electrical & Electronics Engineers (IEEE) 1667 standards (e.g., "Standard Protocol for Authentication in Host Attachments of Transient Storage Devices"). In a current IEEE 1667 standard, a probe silo and a distributed authentication silo are described. Beyond these two silo types, proprietary silos are envisioned. In certain example implementations, a memory storage device may include a tamper detection configuration silo that comports with an IEEE 1667 standard to enable configuration actions via a standardized transport mechanism.

With respect to integration with the file system 112 of the host, a typical file system utilizes a file table 140 mechanism that indicates where each file or various portions of a file logically reside on the disk. Via various attributes as described below, an authenticated user can see and/or modify device level protections on a per-file basis, without requiring modification to existing file systems, such as via a user interface 144 coupled to or incorporating an attribute mechanism 146. An unauthenticated user cannot change attributes, and may or may not be able to see the metadata of encrypted files, depending on how the device is configured, as described below.

Turning to aspects related to attributes, in one implementation, corresponding to the NT file system (NTFS) and FAT (File Allocation Table) file system, integrating the host file system with device side file level protection which is performed by attribute extension or attribute overloading. To this end, consider that a user wants the following example files set up with the following device-side protection levels as set forth in Table 1:

TABLE 1

| File Name | Device-Side Protection |
| --- | --- |
| abc.txt | Encrypted |
| def.txt | None |
| ghi.txt | Write Protected |
| jkl.txt | Encrypted |
| mno.txt | None |

For a file system such as NTFS in which an attribute that indicates the level of protection of a file may be appended to file metadata, a value or the like indicative of the level of protection may be appended as an extended attribute. For example, a file system such as NTFS allows multiple streams, whereby an attribute that indicates the level of protection of a file may be appended via another stream, (note that an unprotected file may be left without such an extended attribute, that is, the absence of any such device protection attribute indicates the file is unprotected). As described below, a file system level driver 142 can process the alternate stream/extended attribute and take appropriate actions with respect to file access and/or hiding or showing the file.

When using a file system such as FAT in which straightforward attribute extension is not practical, an existing attribute (or set of attributes) is used for device side file level protection, that is, one or more existing attributes of those that are available is overloaded. In general, the attribute, as overloaded for device side file level protection, is used to indicate (in the file table corresponding to the file system) the level of device side protection that is set for each file. This information may be processed for various purposes, including user interface purposes as described below with reference to FIGS. 3 and 4.

Attribute overloading allows a file system to maintain its existing specification by changing the use of an existing (but unused or unimportant) attribute to indicate device protection level. If the set of attributes is limited in the number of available bits (e.g., eight bits in the FAT file system), then all possible device protection levels may not be expressed. However one FAT-based implementation that has only three levels of protection (unprotected, write protected and encrypted) utilizes the unused bits of the existing FAT file attributes field for attribute overloading.

By way of example, Table 2 shows one possible modification and usage of FAT File Attributes (Byte Offset 0x0b):

| Bit | Current Use | Use w/Device Side Protection |
|---|---|---|
| 0 | Read Only | Read Only |
| 1 | Hidden | Hidden |
| 2 | System | System |
| 3 | Volume Label | Volume Label |
| 4 | Subdirectory | Subdirectory |
| 5 | Archive | Archive |
| 6 | Device (internal use) | Device-side Encrypted |
| 7 | Unused | Device-side Write Protected |

Table 3 shows the FAT attributes with respect to device-side protection indication corresponding to the example files above:

| File Name | File Attributes |
|---|---|
| abc.txt | 0x40 |
| def.txt | 0x00 |
| ghi.txt | 0x80 |
| jkl.txt | 0x40 |
| mno.txt | 0x00 |

It should be noted that the bits used for device-side protection may be reversed, e.g., bit 7 may be used to indicate encryption. Further, only one of the bits need be used if only one of the types of protection is in use in a given implementation, or multiple bits may be used up to their possible combinations. Thus, in an example in which two levels of encryption are desired, along with write protection (but not write protection and encryption on the same file), bits six and seven may be 00 for no protection, 01 for encryption level one, 10 for write protection, and 11 for encryption level two.

Still further, overloading other attributes may be feasible in a given system. In general, any combination of attribute bit values that is otherwise unused or not possible for a conventional file system (e.g., due to mutually exclusive settings), yet does not confuse the existing file system, may be used as a device-level protection indicator.

In one implementation, whether using attribute extension or attribute overloading, the file names of encrypted files are visible even if the underlying data contained in the file is encrypted. This results from a single file table (per volume) that is used by the file system to express the locations and attributes of each file. Such visibility of encrypted files may be undesirable to certain users, who not only do not want their data protected, but do not want others to even know a given file exists. For example, because modification is permitted to the entries in the file system table for items that have underlying device protection, protected data can become inaccessible or very hard to locate if unauthenticated actions to the table entries are performed.

In one implementation, there is provided a mechanism that protects against such modification, without hindering unauthenticated use of the file system while the device is unauthenticated. At the same time, the mechanism can be used to prevent visibility of any encrypted to unauthenticated users.

Figure 2:
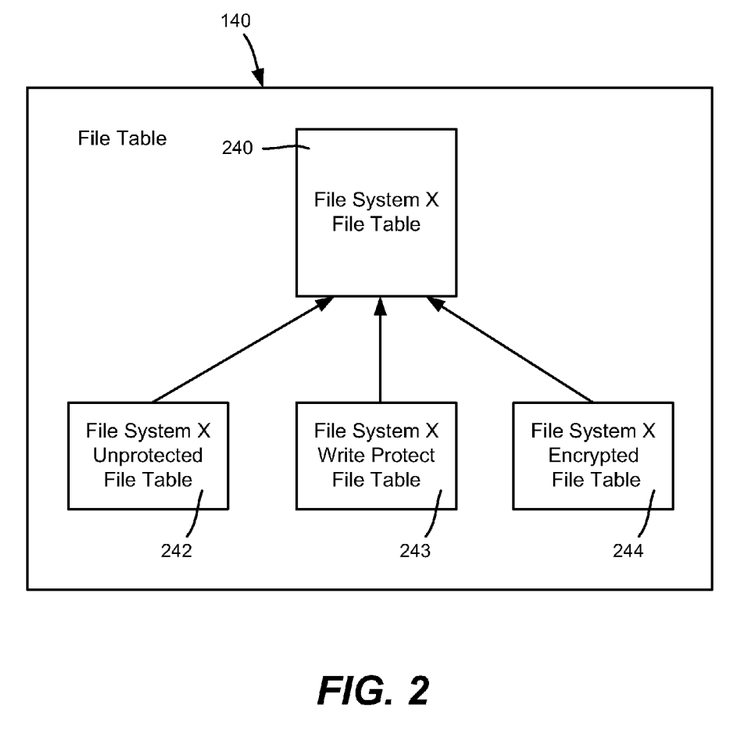
FIG. 2 is a block diagram showing how a single file system file table may be split into multiple file tables, for example with one split file table for each level of protection.

To this end and with reference to FIG. 2, an aspect referred to herein as file table splitting is described, comprising a mechanism by which the per volume file table 140 used by a host file system appears to the file system (e.g., a given file system X) to be a conventional file table 240, but is logically separated into multiple tables 242-244, each table associated with a specific device-side protection level/attribute. Such a mechanism may be implemented via the file system-level driver 142 (FIG. 1) which may be configured to maintain the set of file tables 242-244, and aggregate the information therein as appropriate for a given request so as to provide the appearance of the conventional file table 240 to the file system.

Figure 6:
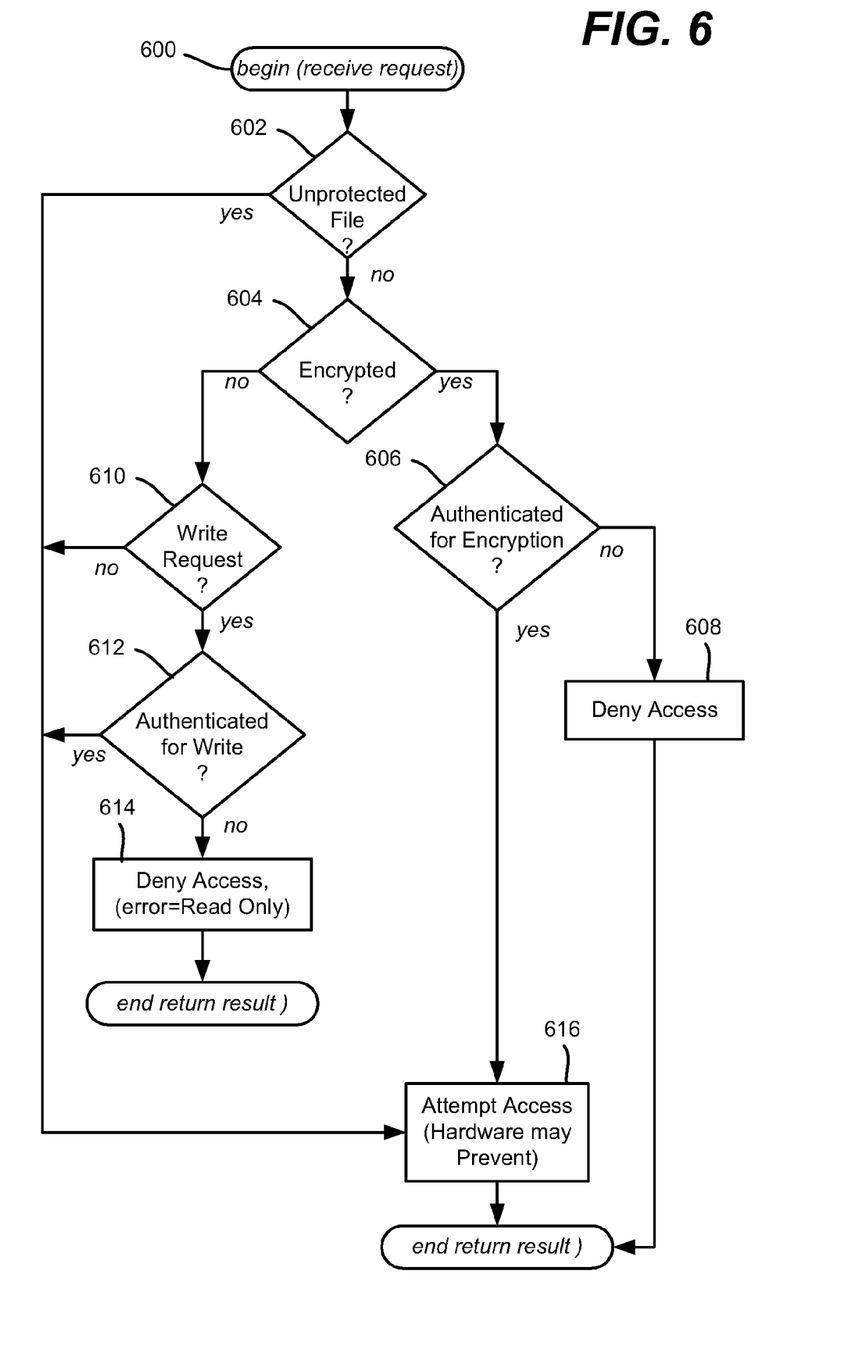
FIG. 6 is a flow diagram showing example concepts related to processing a file access request for a file maintained in a level protected device.

In general, the driver 142 maintains separate entries for the files in the appropriate table depending on each file's protection level, and aggregates the contents of the file tables as appropriate (e.g., as user configured) for user interface viewing and interaction purposes. Also, so as to ensure that storage space is properly accessed and allocated, in one implementation the driver 142 inserts allocated space tracking "dummy" entries in each of the file tables 242-244 to represent the space used in each other file table. For example, in the three-protection-level example of FIG. 2, the unprotected file table 242 includes a dummy file that accounts for the blocks used by the write-protected storage 107 and another file that accounts for the blocks used by the encrypted storage 108; each other table has similar files for the other two storage levels. FIG. 6, described below, shows example logic for processing such space allocation changes in a file table splitting implementation.

In this manner, the host file system 112 operates as normal and accesses what it believes to be a conventional file table 140. However, depending on what the file system is requesting, the driver 142 reads or writes one or more of the appropriate file system tables 224-226. For example, a system may be configured to not show encrypted files to an unauthenticated user, whereby via the attributes, the driver 142 essentially acts as if no such files exist when handling a request (e.g., a directory request) to list files that may include such files. However, an authenticated user will see the files.

Note that because hardware protection is in use, even if the driver 142 is missing or tampered with, and/or the attributes of a file are modified through some other means, a protected file cannot be accessed beyond its level of protection on the device 102 with respect to the authentication level. This is ensured because the user/host has to authenticate to the appropriate level with the access control system 120 of the device.

Figure 3:
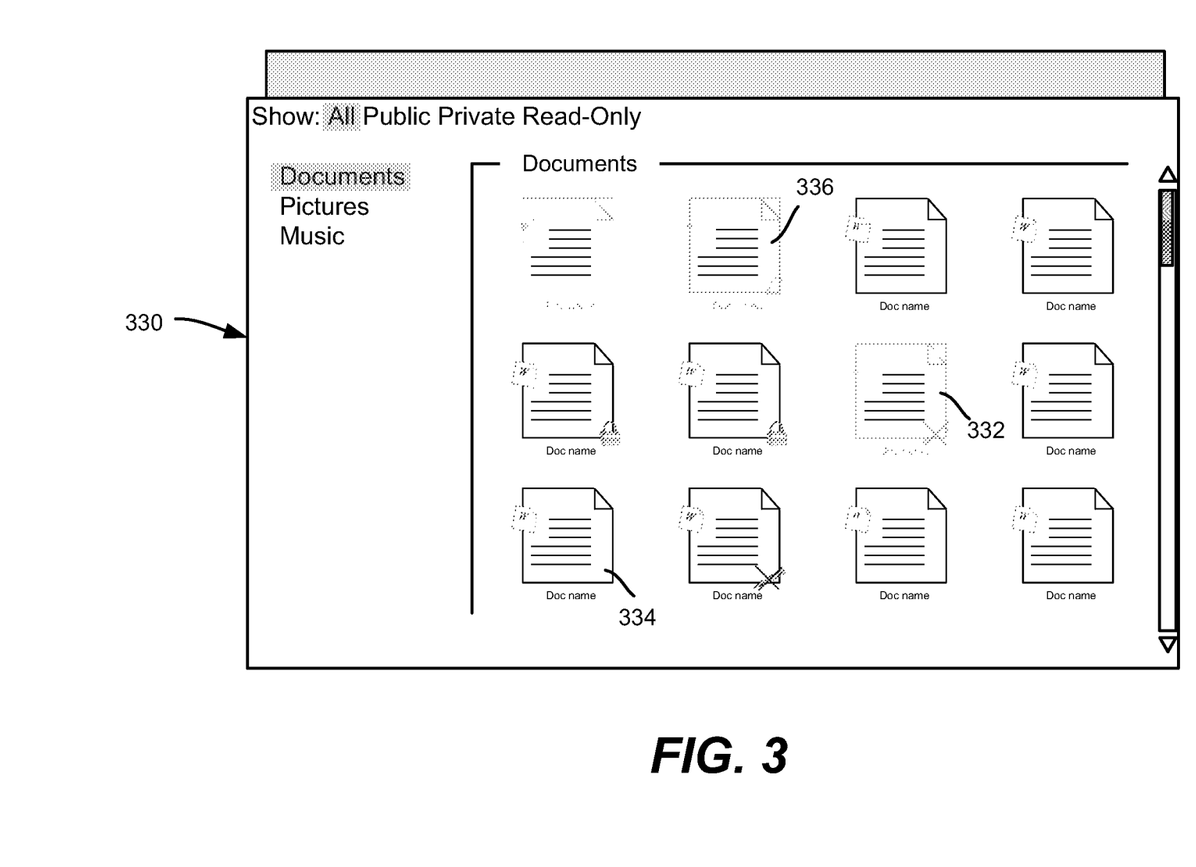
FIG. 3 is a representation of one example user interface that shows how device level protection data may be output as information corresponding to each file's protection level, e.g., as an icon that may have an accompanying protection indicator when protected.

Turning to user interface/user experience aspects, FIG. 3 illustrates an example file explorer user interface 330 in which the level of protection in displayed on a per-file basis as an extension to the file's icon. Significantly, the per-file basis means that concepts such as folders/directories are not necessary for protection levels, that is, differently protected files can reside under the same folder and be viewed for interaction at the same time.

In FIG. 3, an icon such as the icon 332 with a crossed out writing implement indicates that the file is unencrypted with write protection. An icon such as the icon 334 without any added protection indication (e.g., a conventional icon) indicates that the file has no protection.

For encryption protection, an icon such as the icon 336 having a padlock at its bottom right corner indicate that a file is stored encrypted (and likely requires some level of authentication in order to access its contents. As described above, an authenticated user generally will see encrypted files (up to the level of authentication). An unauthenticated user may or may not see encrypted files depending on how the driver/device is configured.

Figure 4:
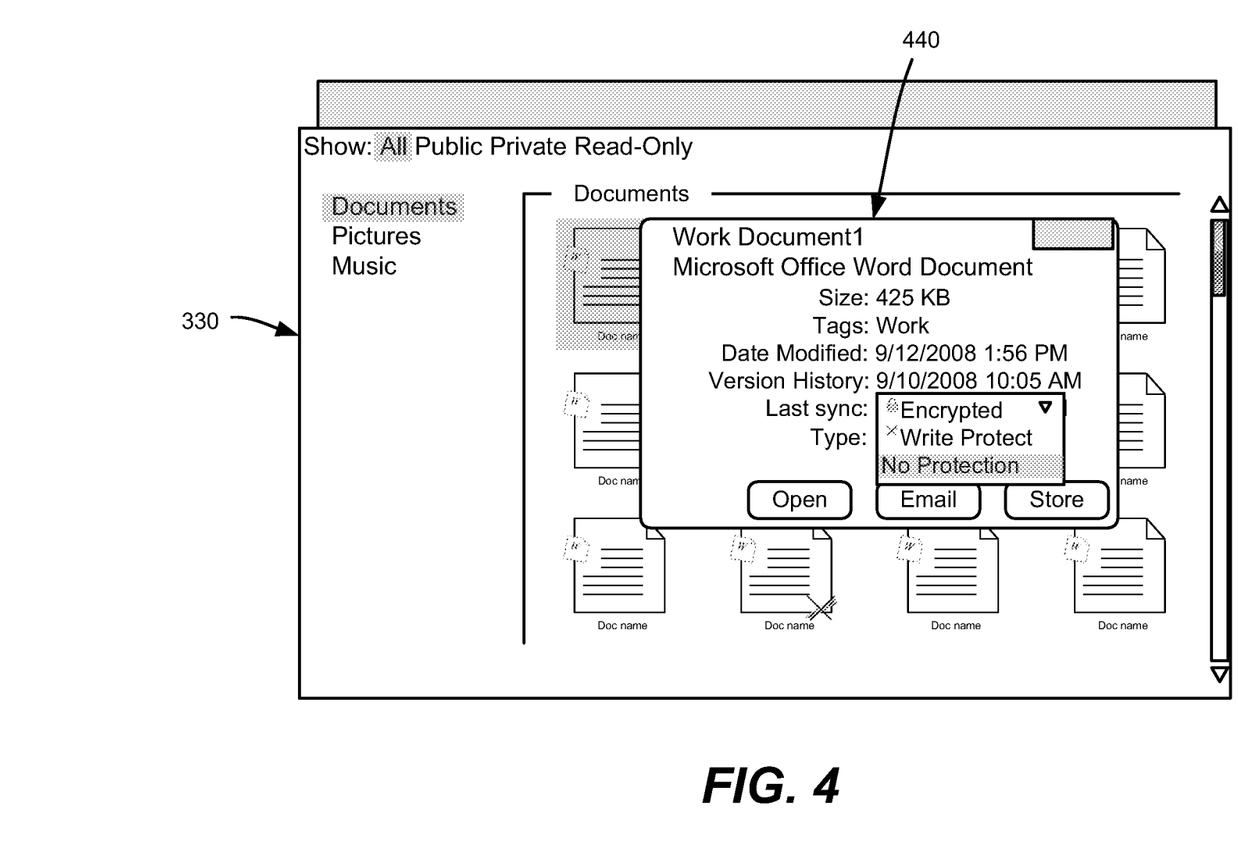
FIG. 4 is a representation of one example user interface that shows how a user may change device level protection of a file.

FIG. 4 illustrates an example user interface dialog for changing the protection level on a given file (assuming proper authentication). In this example, a drop down box 440 is provided (e.g., via right clicking and selecting 'protection') for the currently selected (shaded) file, and shows three options, encrypted, write protected or no protection. Such a drop down box 440 may be expanded to include additional levels of protection, as emphasized herein throughout the description.

In the event the level of protection is changed by an appropriately authenticated user, the attribute is changed, and the file information (e.g., icon) re-rendered as appropriate. Further, in an implementation having multiple file tables, one for each level of protection, the file table entry for that file is basically moved from its previous-level file table to its current-level file table.

Figure 5:
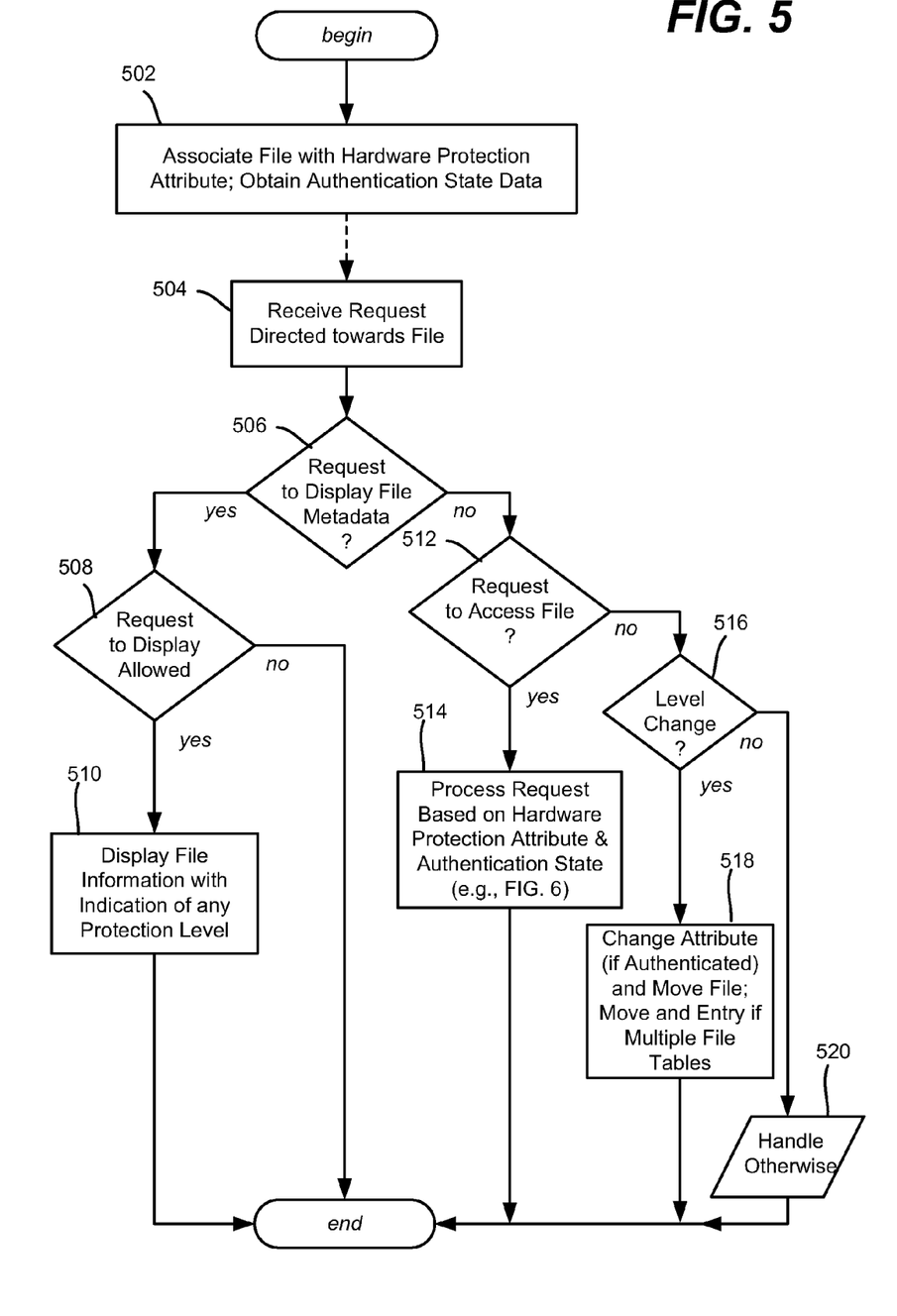
FIG. 5 is a flow diagram showing example concepts related to integrating a file system and various file-related requests with files in a device level protected device.

FIG. 5 illustrates various general aspects related to device level file protection, beginning at step 502 where a file is associated with a hardware protection attribute. Step 502 also represents some authentication state data being available when the device is connected to a host, such as state data indicating whether there is no authentication, write access authentication, or encryption authentication; (a "full" authentication allows a user to write access authentication and encryption authentication with a single authentication, that is, a user does not have to authenticate twice).

Some operation later, as represented by the dashed arrow to step 504, a request is received that is directed towards a file on the device. If at step 506 the request is to display file metadata, such as if a user interface is requesting that information about the file be displayed in a folder representation, the attribute mechanism checks at step 508 whether the display request is allowed. The request is allowed if the file is encrypted and the user is authenticated to access encrypted files, or if the configuration is such that all files are visible to any user. If allowed, the file information is displayed, along with any indication of the protection level, such as represented in FIG. 3.

If not a request to display metadata, the request is typically one to access the file contents for read or write, as evaluated at step 512. If the request is to access the file contents, the request is likewise handled as appropriate according to the protection level and authentication state at step 514, which in one implementation corresponds to the steps of FIG. 6.

Figure 7:
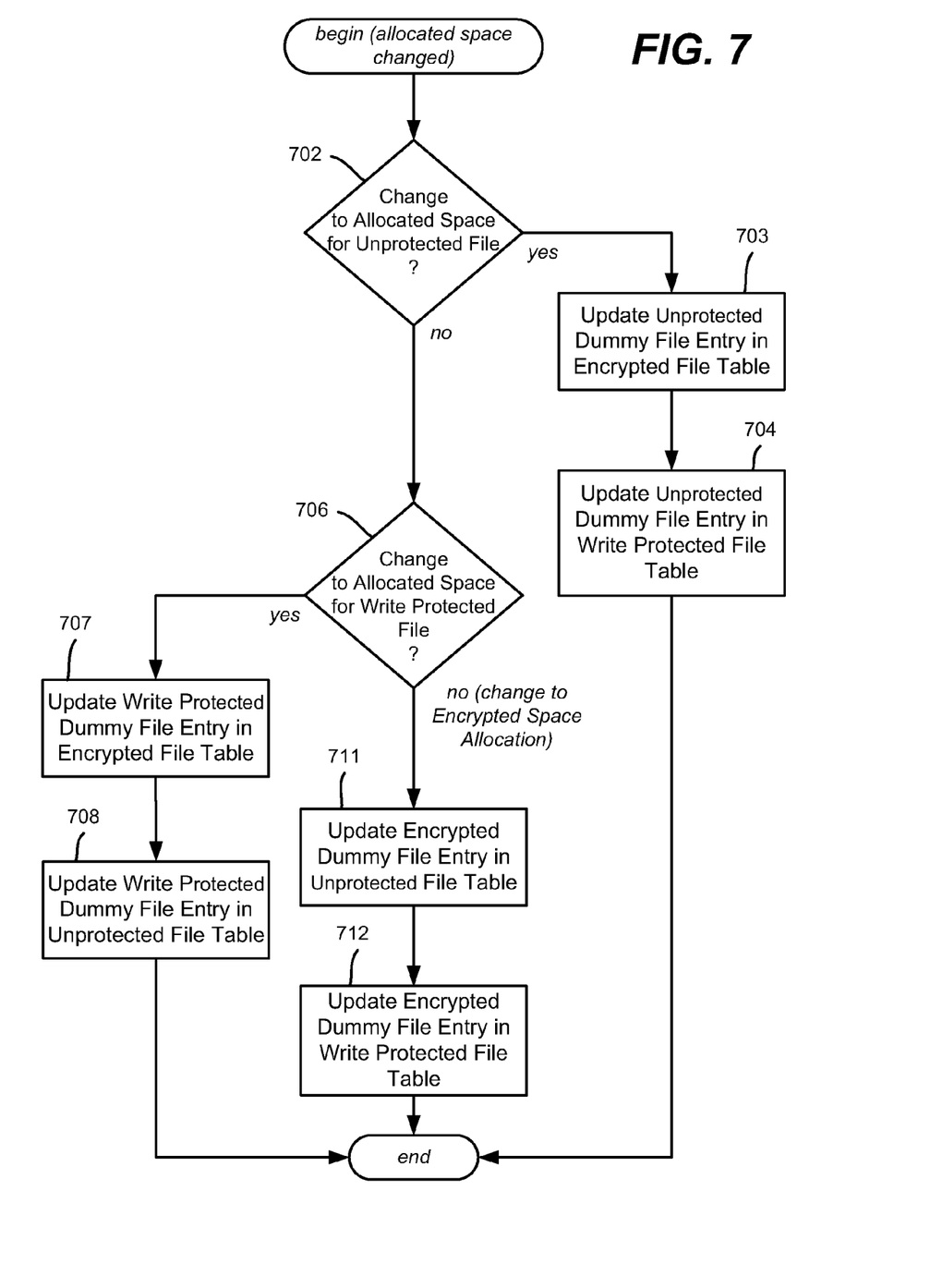
FIG. 7 is a flow diagram showing example steps related to maintenance of a plurality of split file tables.

Step 516 represents determining whether the action corresponds to changing a file's hardware protection level. If so, and the user is authenticated for such a change, at step 518 the attribute is changed, and the file is moved from in the storage device (logically and/or physically) to change its actual hardware protection level. Also, in a multiple-file table scenario, the appropriate entries are updated, e.g., to move the entry to the appropriate table and update the space allocation tracking files; (FIG. 7 shows an example of updating the space allocation tracking files).

The "no" branch of step 516 to step 520 represents any other requests, such as a request to rename the file. Such requests are handled as appropriate according to the protection level and authentication state, as generally represented by step 520.

FIG. 6 summarizes logic that a driver or the like may take with respect to integrating with a file system given a file's attributes, beginning at step 600 where a file access request is received. Note that for purposes of brevity, in the example of FIG. 6, only three levels of protection exist, namely unprotected, write protected or encrypted.

Step 602 represents evaluating the attributes, if any, to determine whether the file is unprotected. If not, access is attempted via step 616; note that device hardware may still prevent the access, such as if the attribute was tampered with.

If not unprotected, step 604 represents evaluating whether the file is encrypted. If so, and the user is authenticated as checked via step 606, access is attempted at step 616. Ordinarily this access will succeed, unless it fails for a conventional reason, e.g., the request is to write data and the device storage is full.

If not unprotected (step 602) and not encrypted (step 604), then in this three-level example write protection is set. Step 610 evaluates whether the request is to write data; if not, access is attempted via step 616. If the request is for a write, step 612 checks whether the user is authenticated for writing to the file. If not, access is denied at step 614, otherwise access is attempted via step 616. Again, note that device hardware may still prevent the write, such as if the attribute was improperly changed from encrypted to write protected.

FIG. 7 exemplifies the file splitting logic with respect to space allocation. Again for purposes of brevity and consistency with FIG. 2, in the example of FIG. 5, only three levels of protection exist, namely unprotected, write protected or encrypted.

Steps 702-704 are directed towards updating the allocated space tracking (dummy) file entries, which for an unprotected file includes one entry maintained in the encrypted file table and one entry maintained in the write protected file table. Note that it is feasible to have more than one such allocated space tracking file, such as if one gets too large for efficient maintenance.

Similarly, steps 706-708 handle updating the allocated space tracking file entries for a write protected file, namely in the encrypted file table and in the unprotected file table. Steps 711 and 712 update the allocated space tracking file entries for an encrypted file, respectively.

Exemplary Operating Environment

Figure 8:
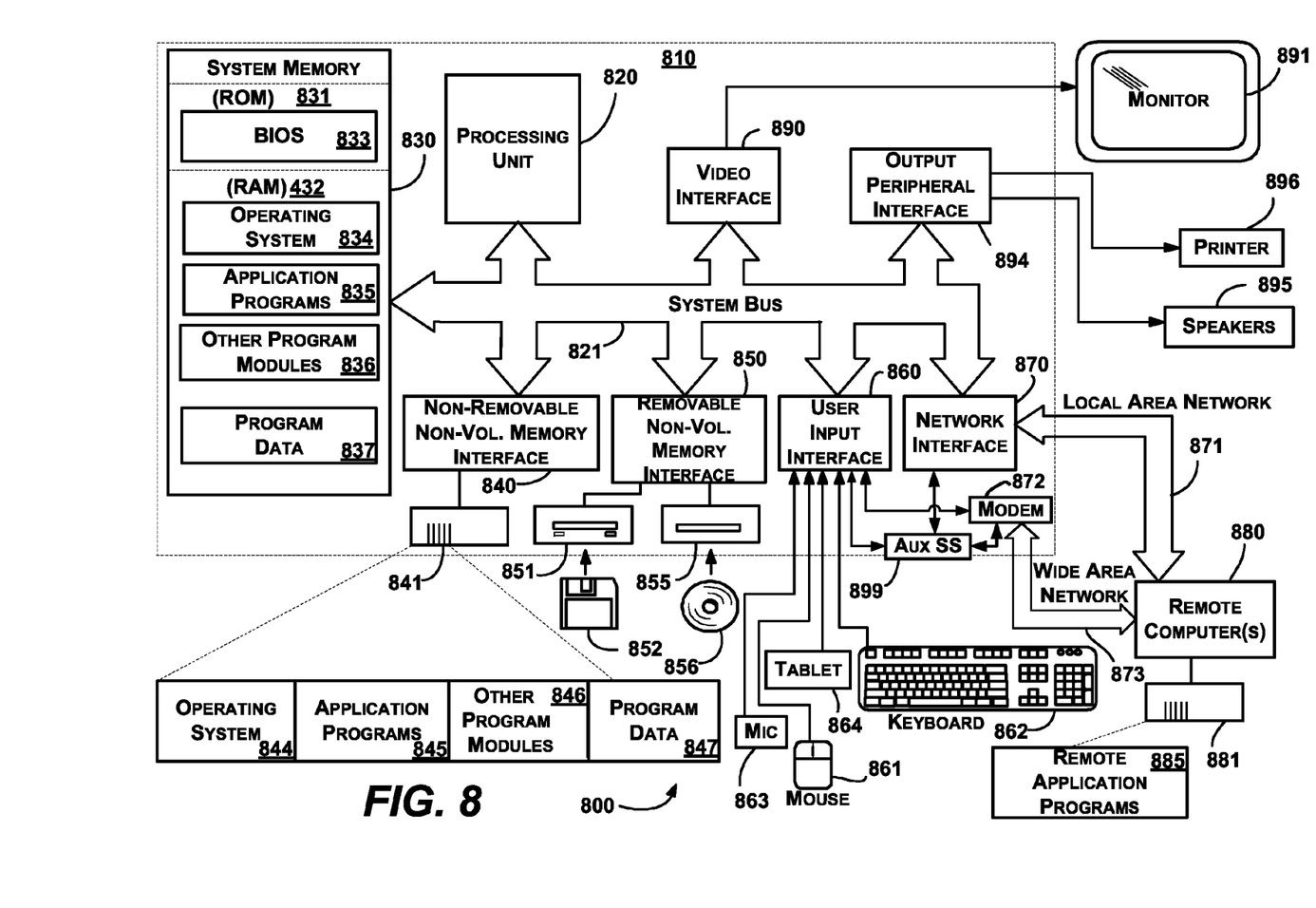
FIG. 8 shows an illustrative example of a computing environment into which various aspects of the present invention may be incorporated.

FIG. 8 illustrates an example of a suitable computing and networking environment 800 on which the examples of FIGS. 1-6 may be implemented. The computing system environment 800 is only one example of a suitable computing environment and is not intended to suggest any limitation as to the scope of use or functionality of the invention. Neither should the computing environment 800 be interpreted as having any dependency or requirement relating to any one or combination of components illustrated in the exemplary operating environment 800.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 8, an exemplary system for implementing various aspects of the invention may include a general purpose computing device in the form of a computer 810, e.g., as a host computer system. Components of the computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 810 typically includes a variety of computer-readable media. Computer-readable media can be any available media that can be accessed by the computer 810 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 810. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836 and program data 837.

The computer 810 may also include other removable/non-removable, volatile/nonvolatile computer storage media. By way of example only, FIG. 8 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media, described above and illustrated in FIG. 8, provide storage of computer-readable instructions, data structures, program modules and other data for the computer 810. In FIG. 8, for example, hard disk drive 841 is illustrated as storing operating system 844, application programs 845, other program modules 846 and program data 847. Note that these components can either be the same as or different from operating system 834, application programs 835, other program modules 836, and program data 837. Operating system 844, application programs 845, other program modules 846, and program data 847 are given different numbers herein to illustrate that, at a minimum, they are different copies. A user may enter commands and information into the computer 810 through input devices such as a tablet, or electronic digitizer, 864, a microphone 863, a keyboard 862 and pointing device 861, commonly referred to as mouse, trackball or touch pad. Other input devices not shown in FIG. 8 may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a video interface 890. The monitor 891 may also be integrated with a touch-screen panel or the like. Note that the monitor and/or touch screen panel can be physically coupled to a housing in which the computing device 810 is incorporated, such as in a tablet-type personal computer. In addition, computers such as the computing device 810 may also include other peripheral output devices such as speakers 895 and printer 896, which may be connected through an output peripheral interface 894 or the like.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 8. The logical connections depicted in FIG. 8 include one or more local area networks (LAN) 871 and one or more wide area networks (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860 or other appropriate mechanism. A wireless networking component 874 such as comprising an interface and antenna may be coupled through a suitable device such as an access point or peer computer to a WAN or LAN. In a networked environment, program modules depicted relative to the computer 810, or portions thereof, may be stored in the remote memory storage device. By way of example, and not limitation, FIG. 8 illustrates remote application programs 885 as residing on memory device 881. It may be appreciated that the network connections shown are exemplary and other means of establishing a communications link between the computers may be used.

An auxiliary subsystem 899 (e.g., for auxiliary display of content) may be connected via the user interface 860 to allow data such as program content, system status and event notifications to be provided to the user, even if the main portions of the computer system are in a low power state. The auxiliary subsystem 899 may be connected to the modem 872 and/or network interface 870 to allow communication between these systems while the main processing unit 820 is in a low power state.

Conclusion

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising, associating a file maintained on a storage device with at least one of an encryption protection attribute or a write protection attribute by overloading a set of attributes to include the at least one of the encryption protection attribute or the write protection attribute, receiving a request directed towards accessing metadata or actual data of the file, and processing the request based upon the at least one of the encryption protection attribute or the write protection attribute and a state of authentication.

2. The method of claim 1 wherein associating the file comprises using at least one bit of a set of attribute bits defined by a file system to indicate the hardware protection level.

3. The method of claim 2 wherein using the at least one bit comprises using one bit to indicate encryption protection, and using one bit to indicate write protection.

4. The method of claim 1 wherein associating the file comprises extending a set of other attributes associated with the file.

5. The method of claim 4 wherein extending the set comprises including data in an alternate stream.

6. The method of claim 4 wherein associating the file with the at least one of the encryption protection attribute or the write protection attribute comprises including data indicating that the file is protected with device hardware-based encryption, or including data indicating that the file is protected with device hardware-based write protection.

7. The method of claim 1 wherein processing the request comprises providing information indicative of the protection level of the file, including displaying a visible indication that the file is device hardware protected.

8. The method of claim 7 wherein the visible indication appears with visible information regarding the file to indicate that the file is encrypted, or to indicate that the file is write protected.

9. The method of claim 1 further comprising, maintaining a plurality of file tables, each file table corresponding to a level of hardware protection and containing an entry for each file having that level of protection.

10. The method of claim 9 further comprising, maintaining an entry in each file table that tracks space allocated in each other file table.

11. In a computing environment, a system comprising, a storage device that provides hardware protection with respect to file access, and an attribute mechanism configured to integrate a file system with the hardware protection of the storage device by associating a level of device hardware protection with each file maintained on the storage device by overloading a set of attributes of the file to include the at least one of an encryption protection attribute or a write protection attribute, and splitting a file system file table into at least three file tables with one file table for each level of protection, wherein entries in the at least three file tables are maintained based on each file's current level, wherein space allocation tracking entries are maintained in each file table to track space used by at least one other file table.

12. The system of claim 11 wherein the file system comprises the FAT file system or the Windows® NT file system.

13. The system of claim 11 wherein the attribute mechanism comprises a modified existing file system attribute for a file, or an alternate stream for a file.

14. The system of claim 11 further comprising a user interface coupled to the attribute mechanism, including means for outputting information of at least one file including any level of protection associated with each file, and means for changing the level of protection associated with each file.

15. The system of claim 11 wherein the attribute mechanism configured to integrate the host file system further comprises a device driver configured to maintain a plurality of file tables, each file table corresponding to a level of hardware protection and containing an entry for each file having that level of protection, the driver configured to aggregate the file tables to provide a single file table representation to the file system.

16. The system of claim 15 wherein the device driver is further configured to maintain the plurality of file tables by including data in each file table that represents space allocated to files in each other file table.

17. One or more computer-readable storage device having computer-executable instructions, which when executed perform steps, comprising: receiving a request to output information about a file; detecting that attributes of the file are overloaded with at least one of an encryption protection attribute or a write protection attribute; and outputting information about the file, including an indication of a level of device hardware protection of the file with respect to file access and the at least one of the encryption protection attribute or the write protection attribute.

18. The one or more computer-readable storage device of claim 17 wherein the device hardware protection attribute indicates that the file is encrypted, and having further computer-executable instructions comprising, determining whether a current authentication state allows outputting the information about the file, and if so, outputting the information.

19. The one or more computer-readable storage device of claim 18 having further computer-executable instructions comprising, detecting interaction with the file information directed towards changing the level of protection associated with the file, and in response, changing the device hardware protection attribute associated with the file.

20. The one or more computer-readable storage device of claim 19 having further computer-executable instructions comprising, maintaining a file table for each level of protection that the file may have, and moving an entry from one file table to another upon changing the device hardware protection attribute associated with the file.

* * * * *